Fig. 2

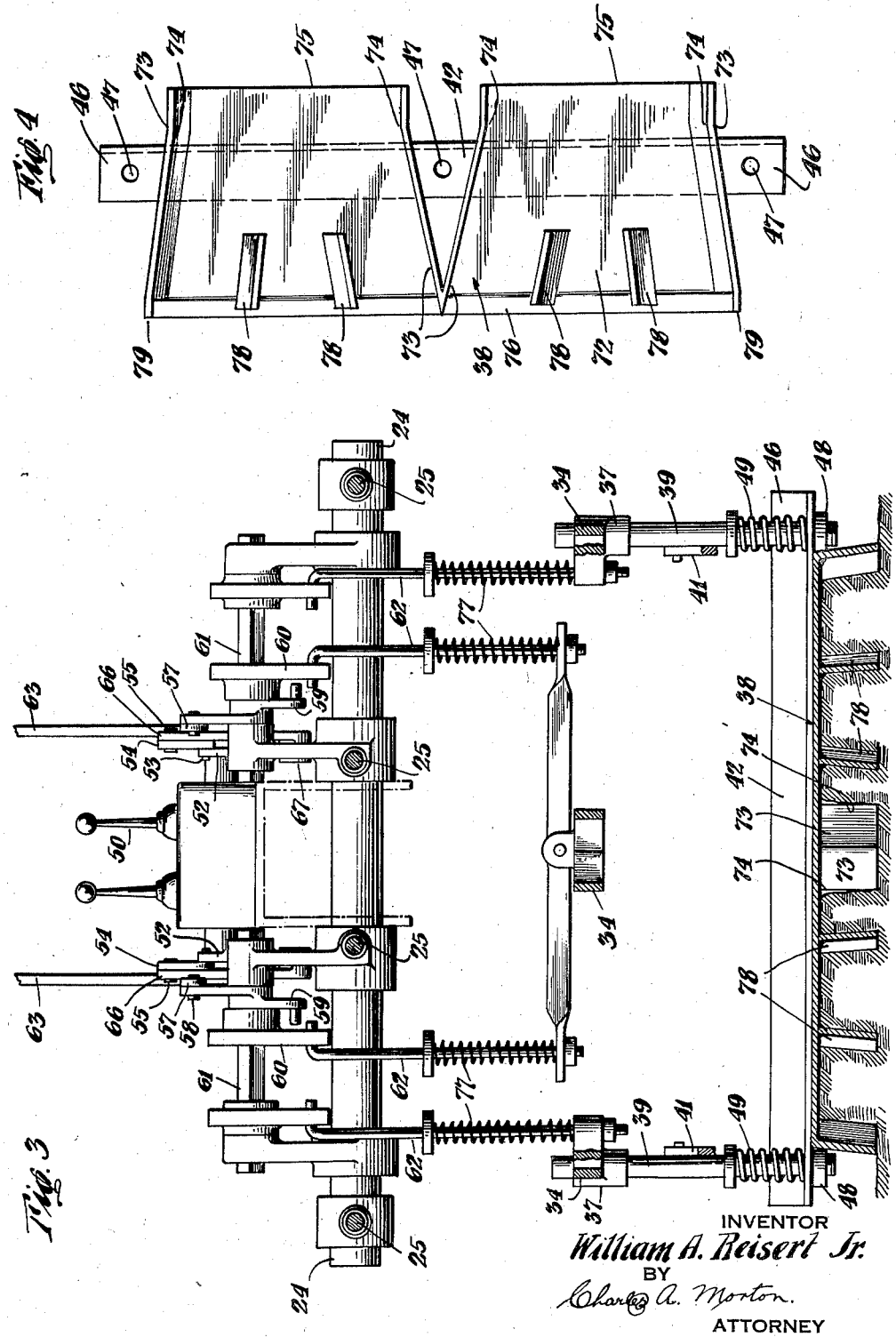

Patented Apr. 30, 1940

2,198,789

UNITED STATES PATENT OFFICE 2,198,789

COMBINED CULTIVATOR AND HILL FORMER

William A. Reisert, Jr., Valley Stream, N. Y.

Application April 27, 1939, Serial No. 270,278

5 Claims. (Cl. 97—47)

This invention relates to improvements in a combined cultivator and hill former and more particularly to a tractor operated combined cultivator and hill former.

One object of this invention is a combined cultivator and hill former which can be adjusted as a single unit. Another object is a combined cultivator and hill former which is visible to the tractor operator at all times. Another object is a combined adjustable cultivator and hill former of few and simple parts. Another object is the efficient collection and distribution of the top soil so as to use it to the best possible advantage. Another object is to facilitate the irrigation and drainage of land under cultivation. Another object is to facilitate the weeding of the growing plants by machinery. Other objects are economy of time and labor.

In the drawings comprising three sheets of five figures numbered Figs. 1 to 5 inclusive.

Fig. 2 is a plan view taken along the line 2—2 of Fig. 1, looking in the direction of the arrows.

Fig. 3 is a vertical cross sectional view taken along the line 3—3 of Fig. 1, looking in the direction of the arrows.

Fig. 4 is a view of the underside of the hill former looking from below; and

Fig. 5 is a side view thereof.

Like reference characters designate corresponding parts throughout the several figures of the drawings.

Figure 1:
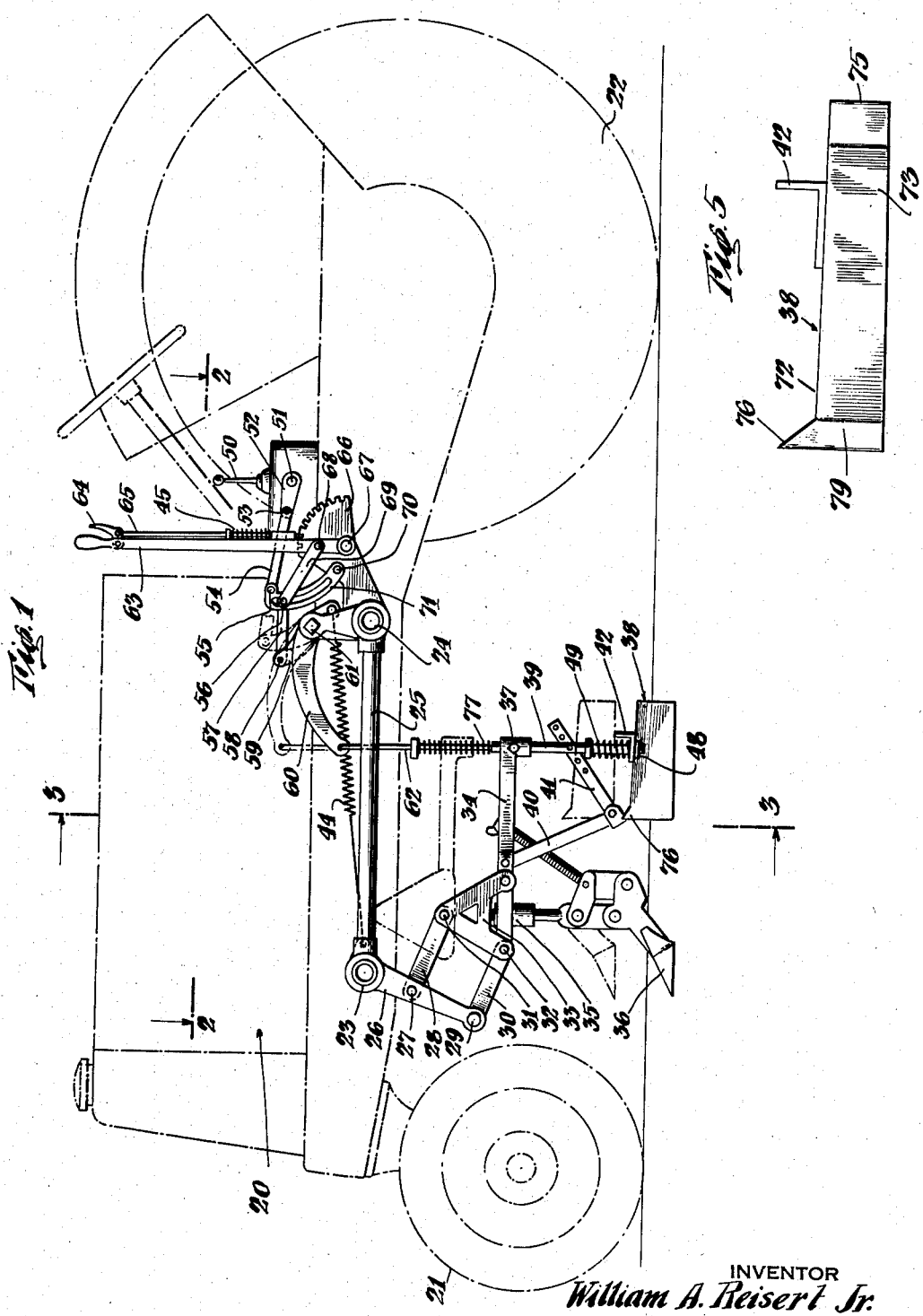
Fig. 1 is a side view of the combined cultivator and hill former, and the control mechanism therefor as applied to a farm tractor.
Figure 2:
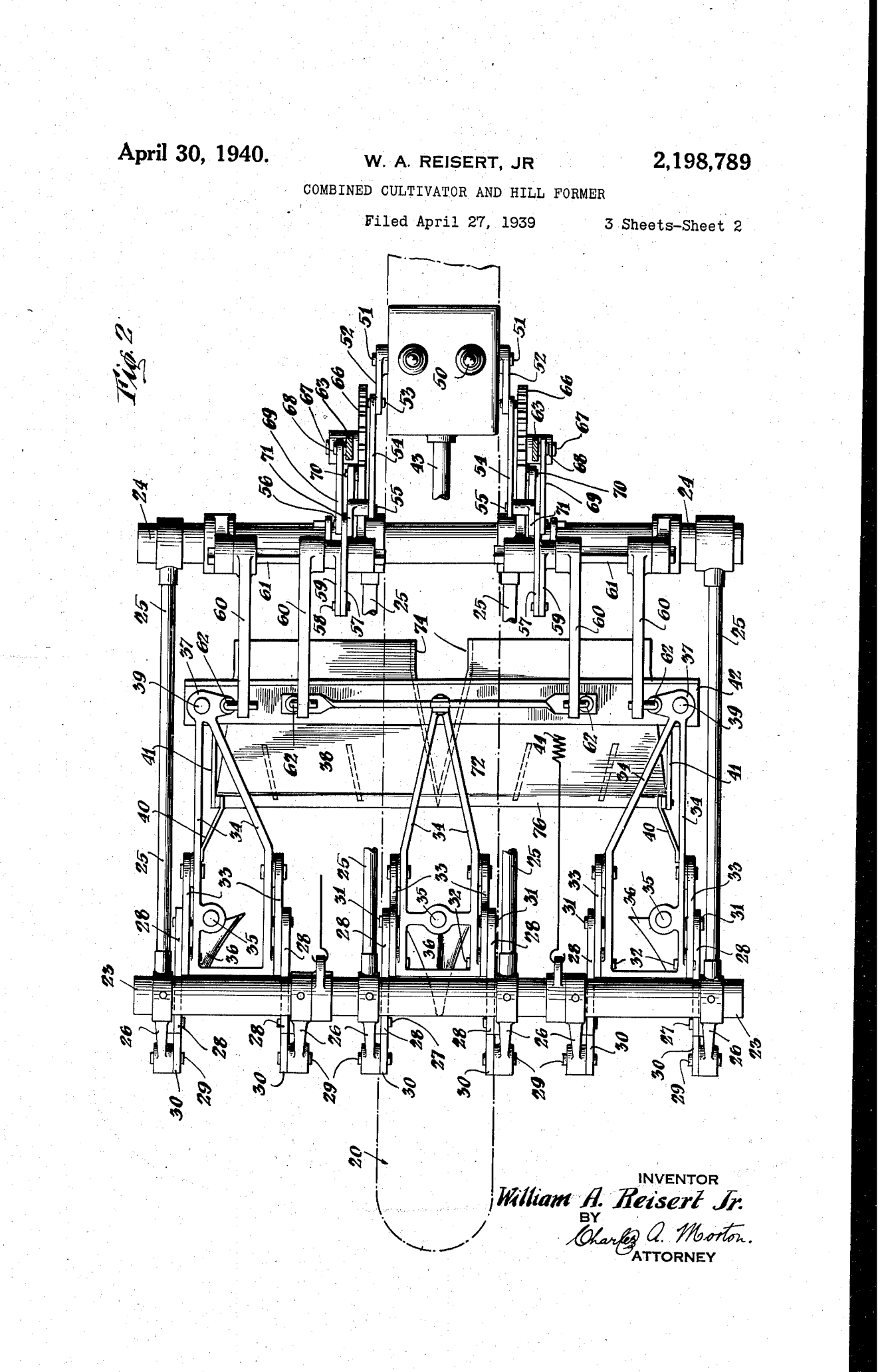

The tractor may be of any preferred type equipped with a suitable gasoline engine 20, front wheel(s) 21 and rear driving wheels 22—22. Secured to the chassis of the tractor in any preferred manner are the front pipe carriers 23—23 and the rear pipe carriers 24—24 for supporting the cultivator carriage. Pipe carriers 23—23 and 24—24 are reinforced by a series of brace bars 25—25 which are clamped between the front and rear pipe carriers at spaced intervals (Fig. 2). A series of brackets 26 are clamped to the front pipe carrier at spaced intervals, on both sides of engine 20, and a series of pairs of parallel link bars 28 and 30, each pair being individual to a bracket 26 are pivotally connected at 27 and 29 to their associated bracket 26; the opposite ends of said parallel link bars being pivotally connected at 31 and 32 to a triangular yoke 33. The triangular yokes 33 and their associated brackets 26 may be cross braced in pairs to form a plurality of sets, and in general at least three such sets are provided (Fig. 2), one set in the center beneath the engine, and the other two sets at equally spaced intervals on opposite sides of the central set. Bolted between each set of triangular yokes 33—33 is a bifurcated lift arm 34 which thus serves to cross brace its associated pair of triangular yokes 33—33. Each bifurcated lift arm 34 includes one or more shovel sockets 35 for adjustably supporting a shovel 36, there being one shovel 36 for each socket 35. The bifurcations of lift arm 34 merge together to form a socket 37 for clamping a lifting rod 39 of a hill former 38 (Figs. 2 and 1).

The hill former 38 which is best illustrated in Figs. 3 and 4 is preferably transversely reinforced with a cross bar 42 of heavy angle-iron, cross bar 42 being riveted, welded, or otherwise attached, to the hill former 38 (compare Figs. 3 and 4). Hill former 38 may be cross braced at 40—40 to lift arms 34—34, and at 41—41 to the lifting rods 39—39. The hill former 38 and the series of shovels 36—36—36 (Fig. 2) are thus combined together to form a single operating unit having the shovels 36—36—36 adjustable relative to each other and to the hill former 38, the whole unit being raised or lowered by a power lift driven from the tractor engine under control of the tractor operator as hereafter described.

Power lift clutch lever 50 (Fig. 1) controls the operation of the power lift lever mechanism, to raise and lower the shovels 36 and hill former 38. Clutch lever 50 when operated connects the main drive shaft 43 of engine 20 to the auxiliary shaft 51. Crank 52 is mounted for movement with shaft 51, and link 54 is pivoted at 53 to crank 52 and at 55 to the arm of the slotted cam 71. The opposite end of the arm of slotted cam 71 is pivotally mounted at 70 to a locking plate 66. Depth control lever 63 is also pivotally mounted at 67 to locking plate 66, and the link 69 is pivoted at one end at 68 to lever 63, and at its opposite end to a cam roller 56 which is mounted for movement in the slotted cam 71. Cam roller 56 also forms a pivotal connection for a link 57, which link is pivotally connected at its opposite end at 58 to a driving crank 59. Driving crank 59 is connected to and turns the square ended main lifting shaft 61, and a plurality of spaced lifting cranks 60 are also connected to main lifting shaft 61 and rise and fall with said shaft. A plurality of lifting rods 62 are pivoted at their upper ends to the lifting crank 60, there being one lifting rod 62 individual to each lifting crank. The lower end of each lifting rod 62 is secured to a socket 37, there being as many sockets 37 as there are lifting rods 62; and a plurality of lifting rods 39 associated with hill former 38 are supported (Figs. 1 and 3) in the sockets 37. Thus when clutch lever 50 is actuated to connect main drive shaft 43 of the running engine with auxiliary shaft 51, crank 52 rotates to draw link 54 about pivot 53 to the right (Fig. 1), link 54 swings slotted cam 71 to the right thus moving link 57 to raise driving crank 59 thus rotating main lifting shaft 61 in a clockwise direction. Lifting cranks 60 swing in a clockwise direction under control of main lifting shaft 61 thus raising the lifting rods 62, sockets 37, lift arms 34, and lifting rods 39 to move the hill former 38 and the associated shovels 36—36 out of engagement with the soil to the dotted line position (Fig. 1). The coiled springs 44 which are slung between an extension ear on the bracket 26 and an extension ear on the driving crank 59 are de-energized by the movement of driving crank 59. When clutch lever 50 is moved to the reverse position the sequence of operations previously described is reversed and the shovels 36 and hill former 38 are lowered in unison into engagement with the soil. The depth at which the shovels 36 and the hill former 38 will operate may be regulated by moving depth control lever 63 about its pivot 67 to vary the position of locking pawl 65 relative to locking plate 66. Pawl 65 is controlled by a trigger 64 and a coiled spring 45.

Hill former 38 consists of two Y shaped channel members yoked together upon a cross bar 42 to which they may be welded, riveted or otherwise secured, welding giving good results. Cross bar 42 may consist of a length of angle-iron. The ends of bar 42 extend beyond hill former 38 to form extension ears 46, and a plurality of openings 47 are drilled in cross bar 42, there being at least one such opening 47 in each extension ear 46 and a third opening 47 may if desired be drilled mid-way between the extension ears (Fig. 4). The lifting rods 39 (Fig. 3), extend through the openings 47 and are bolted to the cross bar 42 by the nuts 48—48. The springs 49—49 mounted upon lifting rods 39—39 act as shock absorbers.

Each Y shaped channel of hill former 38 includes an upwardly flaring front lip 76, a downwardly and rearwardly inclined top portion 72, and downwardly and outwardly bevelled and rearwardly converging side walls 73. The leading edges 79 of side walls 73 extend in parallel for a short distance to form blades for loosening the soil as hill former 38 advances. At a point 74 the rear ends of bevelled side walls 73 cease to converge; and may thereafter diverge slightly for a short distance to form flaring tail members 75—75. A pair of short blades 78 may be mounted within each Y shaped channel; these blades help to cultivate the soil, and as they converge towards the rear of the Y shaped channel they also assist the side walls 73 in forming the hill, thus relieving the strain on side walls 73. Generally speaking the shovels 36 may be omitted when the pairs of short blades 78 are combined with the hill former; this is particularly the case among light, as distinguished from heavy soils.

As the tractor (Fig. 1) advances across the field to be cultivated with the shovels 36 and hill former 38 lowered into cultivating position, the shovels 36 plow or turn over the soil, and as the hill former advances the loose soil is progressively packed into the two Y shaped channels of hill former 38 (Fig. 3), and as the top portion of each Y shaped channel is downwardly and rearwardly inclined, and each pair of bevelled side walls 73 are rearwardly converged, the soil in each Y shaped channel is progressively packed into still more compact form as hill former 38 advances towards the observer (Fig. 3). Thus by the conjoint action of the advancing shovels 36 and the hill former 38, two compactly packed flat topped hills of soil each approximately four inches high, having outwardly flaring side walls with a drainage furrow or valley formed in between them are produced each time the tractor traverses the field to be cultivated.

Each hill is approximately 12 inches wide at the base and 8 inches wide at the top, and the seed is sown substantially along the longitudinal median line of each hill. Subsequently when the seed has sprouted and weeding becomes necessary, the major portion of the weeds can be destroyed mechanically by plowing the furrows or valleys and "shaving" the bevelled side walls of the hills, the relatively few weeds growing upon the flat tops of the hills being readily removable by manual labor. When a second weeding is needed, the operation is reversed and the shovels of the weeding cultivator plow in the valleys between the hills and throw the soil previously shaved off the hills back upon their bevelled side slopes to destroy the weeds in the valleys and bury the relatively few weeds growing upon the side slopes of the previously shaved hills. Thus by alternately shaving the hills and plowing the furrows, and then plowing the furrows and throwing the soil back upon the side slopes of the hills, efficient and relatively inexpensive weeding operations can be performed by machinery, thus eliminating the slow tedious and relatively expensive manual weeding now commonly employed. By the use of the invention, particularly where the top soil is relatively shallow, the device collects and packs the top soil for use around the roots of the plants where the top soil should be plentiful, and removes the top soil from the furrows between the rows of growing plants where the top soil would ordinarily fail to fertilize and assist the growth of the plants. In other words, by the use of applicant's device the top soil is concentrated around the roots of the plants thus providing more top soil for the roots to grow in.

Applicant's hill former providing valleys between the raised hills of plants simplifies irrigation by dispersing the water along the valleys. Conversely it affords better drainage during periods of heavy rainfall; by raising the young plants above the normal field level, it gives more air to the growing plants; furnishes better control of cultivation during the weeding season facilitating the smothering of the young weeds on the hill sides and destruction of the valley weeds by loosening them. In the former practice, weeds growing on a flat tilled surface cannot be smothered, and must be taken away in bushel baskets by hand.

In the drawings the bevelled side walls 73 are shown as fixed extensions of the portion 72; this arrangement produces hills and valleys of uniform contour. But by providing pivotal connections between the bevelled side walls and the top portion 72, each Y shaped channel can be provided with relatively adjustable side walls 73, so as to form an adjustable hill former capable of regulating and varying the width of each pair of frusto-pyramidal hills and of the inverted frusto-pyramidal valley between them.

Experience shows that loamy and light soils are quite satisfactorily cultivated when the hill former is provided with the blades 78 and the side walls 73 are provided with leading edges 79. Under these conditions of cultivation the shovels 36 may be dispensed with.

Hill former 38 may also be provided with relatively adjustable side walls 73 for regulating and varying the relative width of each pair of hills and of the valley between them. Similarly the shovels 36 or the cultivating blades 78 may be combined with the hill former 38 to make one single detachable unit structure, the shovels or blades being detachably and adjustably mounted in any preferred manner relative to the casing of the hill former 38, so that shovels or blades of different sizes may be interchanged and variously adjusted. Such a unit structure may also be provided with adjustable side walls 73.

The shovel and hill former unit is mounted in front of the tractor operator, so that the hills and valleys being produced by the conjoint action of the shovels 36 and hill former 38 are always visible to the operator.

What is claimed is:

1. A cultivating machine comprising, a chassis, an undercarriage, a plurality of cultivating shovels rigidly mounted upon said undercarriage in transverse spaced relation to each other, means rigidly mounted upon said undercarriage immediately in rear of said shovels for collecting the soil loosened by said shovels and for dividing and packing said soil in the form of a plurality of flat topped spaced hills with a valley therebetween, link connections between said chassis and said undercarriage, said link connections being operable to move said undercarriage up and down relative to said chassis to raise and lower said shovels and hill forming means as one single unit out of and into engagement with the soil to be cultivated, power driven mechanism for moving said undercarriage, and means for controlling the movement of said power driven mechanism.

2. A cultivating machine comprising a carriage, traction means for moving said carriage, a common framework, a plurality of cultivating shovels detachably mounted in spaced relation upon said common framework, means detachably mounted upon said common framework immediately in rear of said shovels for collecting the soil loosened by said shovels and for dividing and packing said soil in the form of a plurality of flat topped spaced hills having outwardly and downwardly flaring side walls forming a valley between adjacent hills, link connections between said carriage and said rigid framework, said link connections being operable to move said rigid framework up and down relative to said carriage to raise said shovels and hill forming means out of and lower them into engagement with the soil to be cultivated as one single unit, power driven mechanism for moving said framework, and manually operable means for controlling the movement of said power driven mechanism.

3. A cultivating machine comprising a carriage, traction means for moving said carriage, a frame, a plurality of cultivating shovels detachably mounted upon said frame in spaced relation to each other, means detachably mounted upon said frame immediately in rear of said shovels for collecting the soil loosened by said shovels and for molding said soil in the form of a plurality of spaced frusto-pyramidal hills, means for rockably mounting said frame for up and down movement relative to said carriage, said frame being rockable relative to said carriage to lower said shovels and hill forming means into engagement with and raise them out of engagement from the soil to be cultivated, means for regulating the depth of soil penetration of said shovels, power driven mechanism for moving said frame, and manually operable means for controlling the movement of said power driven mechanism.

4. A combined cultivating and plural spaced hill forming machine comprising a cultivator carriage, a plurality of cultivating shovels detachably adjustably mounted in spaced relation to each other across the width of said carriage, a plural channelled member detachably adjustably mounted upon said carriage immediately in rear of said cultivator shovels for molding the soil loosened by said shovels into a plurality of spaced frusto-pyramidal hills, said channelled member having a downwardly and rearwardly inclined top wall, downwardly and outwardly bevelled and rearwardly converging side walls merging with the edges of said top wall and in continuation thereof, and a centrally disposed wedge-shaped partition wall extending downwards from said top wall, and said top, side, and partition walls, in conjunction, defining an inverted truncated W shaped channel for molding the soil.

5. A combined cultivating and plural spaced hill forming machine comprising a cultivator carriage, a plurality of cultivating shovels detachably adjustably mounted in spaced relation to each other across the width of said carriage, a plural channelled member detachably adjustably mounted upon said carriage immediately in rear of said cultivator shovels for molding the soil loosened by said shovels into a plurality of spaced frusto-pyramidal hills, said channelled member having a downwardly and rearwardly inclined top wall, downwardly and outwardly bevelled side walls of convergent-divergent formation merging with the edges of said top wall and in continuation thereof, and a centrally disposed wedge-shaped partition wall extending downwards from said top wall, and said top, side, and partition walls, in conjunction, defining an inverted truncated W shaped channel for molding the soil.

WILLIAM A. REISERT, Jr.